United States Patent [19]

Gestner et al.

[11] Patent Number: 5,175,197
[45] Date of Patent: Dec. 29, 1992

[54] WATER-BASED INTUMESCENT FIRE BARRIER CAULK

[75] Inventors: Robert E. Gestner; Roger L. Langer, both of St. Paul, Minn.

[73] Assignee: Minnesota Mining and Manufacturing Company, St. Paul, Minn.

[21] Appl. No.: 627,026

[22] Filed: Dec. 13, 1990

Related U.S. Application Data

[63] Continuation-in-part of Ser. No. 462,745, Jan. 10, 1990, abandoned.

[51] Int. Cl.⁵ .............................. C08J 9/16; C08J 9/32
[52] U.S. Cl. .................................... 523/218; 521/122; 521/907; 523/179; 523/219; 252/606; 264/176.1
[58] Field of Search ........... 523/179, 218, 219; 521/907, 122, 91; 252/606; 264/176.1

[56] References Cited

U.S. PATENT DOCUMENTS

| | | | |
|---|---|---|---|
| 3,916,057 | 10/1975 | Hatch et al. | 523/179 |
| 4,189,619 | 2/1980 | Pedlow | 521/91 |
| 4,218,502 | 8/1980 | Graham et al. | 521/122 |
| 4,229,329 | 10/1980 | Bennett | 524/442 |
| 4,234,639 | 11/1980 | Graham | 428/403 |
| 4,273,879 | 6/1981 | Langer et al. | 521/122 |
| 4,434,200 | 2/1984 | Fash et al. | 428/257 |
| 4,521,333 | 6/1985 | Graham et al. | 521/122 |
| 4,666,960 | 5/1987 | Spain | 523/179 |
| 4,952,615 | 8/1990 | Welna | 523/179 |

FOREIGN PATENT DOCUMENTS

| | | |
|---|---|---|
| 0341876 | 11/1989 | European Pat. Off. |
| 0346001 | 12/1989 | European Pat. Off. |
| 2088400A | 6/1982 | United Kingdom |

Primary Examiner—Morton Foelak
Assistant Examiner—John M. Cooney, Jr.
Attorney, Agent, or Firm—Gary L. Griswold; Walter N. Kirn; Jeffrey L. Wendt

[57] ABSTRACT

Water-based, intumescent, fire retardant material is made from, on a dry basis by weight, 100 parts of a latex such as polychloroprene latex and from 50 to 200 parts of water-insoluble intumescent mineral granules such as hydrated alkali metal silicate granules incorporating an oxy boron compound. This water-based intumescent material dries to an elastomeric state that has a Volume Expansion Factor (as defined) of at least two. It chars into a substantially rigid refractory thermal insulator to prevent fire from penetrating through voids into which the novel intumescent material has expanded.

19 Claims, No Drawings

WATER-BASED INTUMESCENT FIRE BARRIER CAULK

This application is a continuation-in-part of U.S. Ser. No. 07/462,745 filed Jan. 10, 1990, now abandoned.

BACKGROUND OF THE INVENTION

1. Field of the Invention

The invention concerns an intumescent, fire retardant material that has the ability to remain in an unexpanded elastomeric form until heat produced by a fire causes it to expand to fill burned-out voids with a fire-resistant barrier. The invention is particularly concerned with intumescent, fire retardant material that is water-based and caulkable.

2. Description of the Related Art

U.S. Pat. No. 4,273,879 (Langer et al.) discloses flexible, intumescent, fire retardant materials that can range from a soft putty-like consistency to a hard rubber. Useful materials can be compounded to include an intumescent component such as hydrated alkali metal silicate granules, an organic binder component such as polychloroprene, an organic char-forming component such as a phenolic resin, and fillers such as silica. If any of the intumescent granules of the examples of the Langer patent were to be immersed in water for long periods of time, the alkali metal would gradually be leached away from the silicate granules, thus reducing their ability to intumesce. In answer to this problem, U.S. Pat. No. 4,218,502 (Graham et al.) applies to the hydrated alkali metal silicate granules a protective moisture-resistant coating such as a metal salt of a long-chain fatty acid.

U.S. Pat. No. 4,234,639 (Graham) further improves intumescent hydrated silicate particles such as those of Graham et al. '502 by coating the granules with a mixture of a halogenated organic compound and an iron-containing compound. When the particles are incorporated into asphalt shingles and exposed to fire, the coating presumably can catalyze the charring of the asphalt.

Like Graham '639, U.S. Pat. No. 4,521,333 (Graham et al.) is also directed to the problem that water is known to leach away the alkali metal from hydrated alkali metal silicate granules. Graham et al. '333 addresses this problem by making intumescent particles from a gel produced from a solution or dispersion of an alkali metal silicate, adding to the gel an oxy boron compound, and then drying and granulating to a convenient particle size. The resulting product retains excellent intumescence even after one hour in boiling water. The product can be produced as caulks and putties by "mixing uncured polymer binder (e.g., polychloroprene) fillers, resins, and possibly adhesion promoters pigments and solvent (e.g., 50/50 mixture of methyl ethyl ketone and xylene) in a kneader mixer. The intumescent particles would be added during the mixing step. The manufacture of putties is explained in U.S. Pat. No. 4,273,879. Putties are generally more viscous than caulks, having a lower flow rate through a standard (6.4 mm) orifice at 345 kPa, for example less than about 150 grams per minute" (col. 9, lines 41-53).

Although the product of Graham et al. '333 is not currently available as a caulk, that of Graham '639 is being marketed as a solvent-based caulk. Although solvent based caulks have satisfactory performance, their use has shown to be unpleasant for dwellers in buildings or homes because organic solvent continues to evaporate from the caulk over a period of weeks. The presence of the solvent can cause headaches, nausea or other ailments commonly associated with the inhalation of the solvents.

Another intumescent caulk that uses a volatile organic solvent as a carrier is described in PCT Pat. Publ. No. WO 88/05804 (Miller). The caulk is a composition of a binder such as polyvinyl butyral in a volatile solvent such as trichloroethane, an endothermic filler such as aluminum oxide trihydrate, an exfoliatable (intumescent) mineral such as vermiculite, and preferably also a thixotropic agent such as precipitated silica.

Currently on the market are water-based caulks that are said to be intumescent and fire retardant, e.g., "Metacaulk" from Metalines, Inc. We do not know their compositions, but they are not nearly as intumescent as is the aforementioned caulk made using the Graham '333 granules.

SUMMARY OF THE INVENTION

The invention provides what is believed to be the first intumescent, fire retardant material that is water-based and can be used as a caulk that is substantially equal in intumescence and fire retardancy as compared to the best available caulk that employs organic solvents.

Briefly, the water-based, intumescent, fire retardant material of the invention comprises on a dry basis by weight:

100 parts of a latex of a halogenated or non-halogenated latex and from 50 to 200 parts of water-insoluble intumescent mineral granules.

The novel water-based intumescent material dries to an elastomeric state and, upon being exposed to 350° C. for 15 minutes, has a Volume Expansion Factor (expanded volume divided by initial volume) of at least two. Because it chars into a substantially rigid refractory thermal insulator that resists the erosive effects of a high-pressure stream of water, it can be employed in a wall or floor to prevent fire from penetrating through voids into which the novel intumescent material has expanded due to the heat of the fire.

When used as a caulk, the novel intumescent material should contain sufficient cellulosic thickener to prevent sagging. To do so, the caulk preferably contains at least 2 parts of cellulosic thickener, whereas the use of more than 15 parts tends to make the caulk undesirably viscous. Regardless of its intended use, the water-based intumescent material of the invention preferably contains up to 50 parts of an endothermic filler such as aluminum oxide trihydrate. Because it increases the viscosity of the water-based intumescent material, a larger amount of an endothermic filler lessens the need for a cellulosic thickener when the intumescent material is to be used as a caulk.

The novel water-based intumescent material may also contain small amounts of materials commonly found in latices such as surfactants, dispersants, defoamers, antioxidants, pigments, and reinforcing fillers such as glass fibers.

DETAILED DISCLOSURE

For use in the novel water-based intumescent material, the preferred water-insoluble intumescent mineral granules are those of Graham et al. U.S. Pat. No. 4,521,333 which is hereby incorporated by reference. Graham et al. '333 discloses an intumescent composition comprising a mixture of alkali metal silicate represented by the formula $M_2O:xSiO_2$ in which M is an alkali metal. The mixture also includes at least one oxy boron compound which may be selected from the group consisting of boric acid and borate salts of group I and II elements and water. The weight ratio X ranges from about 1.5 to about 4, the molar ratio of boron to M is between about 0.2 and about 0.9, and the water comprises about 5 to 15 weight percent of the total composition.

There are many silicates which could be used. Examples cited in Graham et al. '333 include sodium silicate, lithium silicate and potassium silicate.

There are many oxy boron compounds which could be used for the present invention. Examples cited in Graham et al. '333 of oxy boron compounds include metaborate, tetraborate, perborate, polyborate radicals, boric acid, colemanite, calcium metaborate, magnesium borate and zinc borate. It is surprising the '333 granules could be successfully employed in a water-based intumescent material because, when those granules were immersed in water for 10 weeks at room temperature, their ability to expand at 538° C. dropped to 75% of the initial ability (to 52% after 100 weeks).

There are numerous cellulosic thickeners which can be employed. Any commercially available thickener is envisioned, with preferred cellulosic thickeners including hydroxyethyl cellulose, hydroxypropylmethyl cellulose, and carboxymethyl cellulose, each of which is readily available at reasonable prices.

There are many latexes which are suitable for the present invention. A preferred latex is a halogenated latex with the most preferred being polychloroprene latex, because it enhances both flame-retardance and char strength. Furthermore, it is readily available at reasonable cost. When the latex includes polychloroprene, the water-based intumescent material of the invention preferably includes an HCl scavenger such as zinc oxide.

There is another group of latexes which are also desirable and suitable for the present invention. These latexes are non-halogenated latexes.

Examples of non-halogenated latexes generally include acrylate polymers, natural rubbers, styrene butadiene copolymers, butadiene acrylonitrile copolymers, polyisoprene, and polybutadiene. More specifically, latexes such as an acrylate polymer, commercially available from Rohm and Haas Co. under the trade designation "Rhoplex HA-8," an ethylene/vinyl acetate/acrylate terpolymer, commercially available from Air Products and Chemicals under the trade designation "Flexbond 153," and a vinyl acetate/dioctyl maleate copolymer, commercially available from Air Products and Chemicals under the trade designation "Flexbond 149," are all acceptable latexes under the present invention.

When non-halogenated latexes are used, it is preferred to employ a flame retardant. This is due to the fact that halogens can act as flame retardants, and, thus, the absence of a halogen requires the addition of a flame retardant. Generally, flame retardants such as phosphorous compounds, glass frit compounds, boron compounds, alumina trihydrate, antimony oxides, and other metal oxides and hydrates are all useful. When 100 parts of a non-halogenated latex is used, it is preferred to have about 5 to 200 parts of a flame retardant.

Although the present invention prefers an elastomeric latex, it is the final cured product that requires a degree of elasticity. The advantages of the use of an elastic caulk in a ceiling, wall or floor material is that the caulk withstands movement or vibration of the material to which it adheres. It is possible, under the present invention, to utilize a non-elastomeric latex, but it is preferred to add sufficient plasticizer to the caulk to provide a degree of elasticity to the final cured product.

Endothermic fillers used include aluminum oxide trihydrate. Aluminum oxide trihydrate acts as a endothermic filler by giving off water vapor leaving aluminum oxide, which is refractory and when exposed to high temperatures, combines with other organic material present to form a hard, fire retardant crust.

Testing

"Volume Expansion Factor"

After being allowed to stand for 24 hours at ordinary room temperature, a material to be tested is spread onto a release surface and, using shims, pressed to a thickness of 3 mm and allowed to dry overnight. From the resulting sheet, 2.54 cm diameter test specimens are die-cut. The volume of each specimen is measured before and after 15 minutes in an oven at 350° C., and the ratio is the "Volume Expansion Factor." A volume expansion factor of at least about 2 is preferred.

ASTM Test Method E 814-83

Openings of several diameters in a simulated concrete floor are closed with a sheet of mineral wool batting 2.54 cm in thickness. Over this is spread an intumescent caulk to various thicknesses. A thermocouple is at the top surface of the caulk. This simulated floor is used to close the top of a gas-fired furnace which is then heated over a period of three hours to at least the following temperatures:

| After (min.) | Temperature | |
|---|---|---|
| | °F. | °C. |
| 0 | 75 | 24 |
| 5 | 1000 | 538 |
| 10 | 1300 | 704 |
| 30 | 1550 | 843 |
| 60 | 1700 | 927 |
| 120 | 1850 | 1010 |
| 180 | 1925 | 1052 |

The time at which the thermocouple reaches 163° C. above ambient, i.e., reaches 204° C., is the "T-Rating". The "T-Rating" indicates the insulation characteristics of the material.

At 3 hours, the simulated floor is removed, positioned vertically, and subjected to a stream of water from a fire hose. An "F-Rating" of 3 hours indicates that there was no opening that would permit a projection of water beyond the unexposed side.

Char Strength Test

The char strength test is a test to simulate the ASTM E-814 test. A brick with a 2.5 centimeter diameter hole is filled to a depth of 1.25 centimeters with the caulk composition. The composition is dried, and then exposed to a 350° C. temperature for five minutes using a propane torch (7.5 centimeter flame length, 7.5 centimeters distance). After five minutes, the sample is then exposed to a temperature of 825° C. for ten minutes by moving the torch to a 2.5 centimeter distance away.

The char resulting from this test is then rated qualitatively on a scale of one to ten, with ten being the strongest char (i.e., least friable) and corresponding to the char strength obtained by Example 1 in this test. A char strength of 6 or better is acceptable in that it is sufficiently strong to act as a support structure and does not easily crumble after being subjected to intense heat for an extended period of time. An acceptable char strength is essential for the caulk composition to withstand the water hose portion of ASTM E-814-83, as described above.

EXAMPLES

Ingredients used to produce water-based intumescent, fire retardant materials of the Examples are listed and described in Table I.

TABLE I

| Ingredient | Supplier | Description |
|---|---|---|
| "Agerite Stalite" S | R. T. Vanderbilt | Dioctyldiphenyl amine |
| "Calgon" | Merck & Co. | Sodium hexametaphosphate |
| "Daxad" 11G | W. R. Grace | Sodium salt of polymerized alkyl naphthalene sulfonic acid |
| "Expantrol" 4 | 3M | Hydrated alkali metal silicate granules containing oxy boron compound |
| "Fiberglas" 731ED 1/16 inch | Owens/Corning | Milled glass fibers |
| "Foamaster" 111 | Henkel Process Chemicals | Hydrocarbon Liquid |
| "Methocel" K4M | Dow Chemical | Hydroxypropyl methyl cellulose |
| "Neoprene" 654 latex | E. I. duPont | Latex of low modulus polychloroprene homopolymer in an anionic colloidal system |
| "Tamol" 850 | Rohm & Haas | Sodium salt of polymeric carboxylic acid |
| "Techfill" A-212 | Great Lakes Mineral | Aluminum oxide trihydrate |
| "Triton" X-100 | Rohm & Haas | Alkylphenyl polyether alcohol |
| "Triton" X-405 | Rohm & Haas | Alkylphenyl polyether alcohol |
| "Rhoplex" HA-8 | Rohm & Haas | Latex of an acrylate polymer |
| "Flexbond" 153 | Air Products and Chemicals | Latex of an ethylene-vinyl acetate-acrylate terpolymer |
| "Flexbond" 149 | Air Products and Chemicals | Latex of a vinyl acetate-dioctyl maleate copolymer |
| "Firebrake" ZB Fine | U.S. Borax | Hydrated zinc borate |
| "Exolit" IFR-10 | Hoechst-Celanese | Flame retardant containing 20% phosphorus |
| "Ceepree" C-200 | I.C.I. Chemicals & Polymers | Powdered glass frit |
| "Phos-Chek" P/30 | Monsanto | Ammonium polyphosphate |

In the following examples, all parts are given by weight.

EXAMPLE 1

A water-based intumescent, fire retardant caulk was prepared from the following ingredients:

| | Parts | |
|---|---|---|
| | (dry) | (wet) |
| "Neoprene" 654 latex | 100.0 | 169.5 |
| "Foamaster" 111 (diluted) | 3.84 | 7.68 |
| "Triton" X-405 | 2.8 | 4.0 |
| "Tamol" 850 | 1.2 | 4.0 |
| "Agerite Stalite" S | 2.0 | 2.0 |
| Zinc oxide | 5.0 | 5.0 |
| Iron oxide pigment | 5.0 | 5.0 |
| "Expantrol" 4 | 85.0 | 85.0 |
| "Techfill" A-212 | 30.0 | 30.0 |
| "Fiberglas" 731ED 1/16 inch | 10.0 | 10.0 |
| "Methocel" K4M | 6.05 | 6.05 |

The ingredients were charged in the order listed into a paddle-type mixer (Hobart Model N-50) with continuing mixing except that portions of the "Foamaster" were added from time to time. After about 20 minutes, a homogeneous mixture was obtained, which mixture was caulkable, as indicated by a flow rate through a 6.4-mm orifice at 345 kPa of 2000 g/min. The volume expansion factor of this caulkable mixture was 3.78. The char obtained when this mixture was subjected to the char strength test was extremely hard and durable, and by definition was given a maximum rating of "10" for purposes of comparing the char strength of other mixtures.

A 4-liter pail was filled to about ⅔ of its height with a portion of this mixture, and the pail was stored at ordinary room temperature while sealed except being opened from time to time for retesting. In six tests taken over a period of 42 weeks, the volume expansion factor was always within 2% of the initial value, thus indicating excellent shelf life at ordinary room temperature.

Another portion of this mixture was put into an identical pail to the same height, sealed, and held in an oven at 50° C. for two weeks. This caused about 10% of the mixture to gel so that the mixture was no longer caulkable.

| ASTM Test Method E 814-83 Results | | | | | |
|---|---|---|---|---|---|
| Diameter of Opening | | Caulk Thickness | | T-Rating | F-Rating |
| inches | cm | inches | cm | (Minutes) | (Hours) |
| 2 | 5.08 | 0.5 | 1.27 | 60 | 3 |
| 4 | 10.16 | 0.5 | 1.27 | 45 | 3 |
| 4 | 10.16 | 1.0 | 2.54 | 90 | 3 |
| 6 | 15.24 | 1.0 | 2.54 | 60 | 3 |

EXAMPLE 2

The following ingredients were blended in a high-shear mixer (Waring blender) for about 3 minutes to provide a masterbatch:

| | Parts | |
|---|---|---|
| | (dry) | (wet) |
| Zinc Oxide | 5.0 | 5.0 |
| "Agerite Stalite" S | 2.0 | 2.0 |
| Iron Oxide | 5.0 | 5.0 |
| "Daxad" 11G | 0.3 | 0.3 |
| "Calgon" | 0.3 | 0.3 |
| 41% Sodium Silicate | 0.041 | 0.1 |
| Water | 0.0 | 11.2 |

Using this masterbatch, the following ingredients were mixed in the same manner as in Example 1:

|  | Parts | |
|---|---|---|
|  | (dry) | (wet) |
| "Neoprene" 654 latex | 100.0 | 169.5 |
| "Foamaster" 111 (diluted) | 2.3 | 4.6 |
| "Triton" X-100 (diluted) | 2.8 | 28.0 |
| Masterbatch | 12.65 | 24.0 |
| "Expantrol" 4 | 85.0 | 85.0 |
| "Fiberglas" 731ED 1.5 mm | 10.0 | 10.0 |
| "Methocel" K4M | 9.08 | 9.08 |

This caulkable mixture had a flow rate through a 6.4-mm orifice at 345 kPa of 1000 g/min. Its Volume Expansion Factor was 3.83. Its char strength was 10.

When a portion of this mixture was stored in a pail as in Example 1 and held in an oven at 50° C. for 8 weeks, no gel had formed, and the mixture was still caulkable. The improved storability of the caulk of Example 2 as compared to that of Example 1 is believed to have been achieved because of the masterbatching of the HCl scavenger, antioxidant. pigment, and dispersing agents, thus introducing them into the mixture in a dilute form that is less likely to destabilize the latex.

According to ASTM Test Method E 814-83. the T-Ratings and F-Ratings of Example 2 were equivalent to those of the caulk of Example 1.

The following examples substitute a non-halogenated latex for the halogenated latex of Examples 1 and 2. as well as using different non-latex ingredients. Once the formulations were made, they were tested for expansion and for char strength, as described above.

EXAMPLE 3

The following ingredients were mixed in the order listed into a paddle-type mixer (Hobart Model N-50) with continuous mixing for about 20 minutes at room temperature. The Foamaster was added continuously throughout the mixing.

|  | Parts | |
|---|---|---|
|  | (dry) | (wet) |
| "HA-8" latex | 100.0 | 250.0 |
| "Triton" X405 | 2.8 | 4.6 |
| "Tamol" 850 | 1.2 | 4.6 |
| "Expantrol" 4B | 141.0 | 162.0 |
| "Firebrake" ZB (fine) | 25.0 | 28.8 |
| "Techfill" A-212 | 25.0 | 28.8 |
| "Exolit" IFR-10 | 75.0 | 86.3 |
| "Foamaster" 111 (50%) | 0.9 | 2.0 |
| "Methocel" K4M | 1.5 | 4.0 |

This caulkable mixture had a flow rate through a 6.4 mm orifice at 345 kPa of at least 500 g/min. Its volume expansion factor was 3.01. The char strength was 7.

EXAMPLE 4

The following ingredients were mixed in the order listed into a paddle-type mixer (Hobart Model N-50) with continuous mixing for about 20 minutes at room temperature.

|  | Parts | |
|---|---|---|
|  | (dry) | (wet) |
| "Flexbond" 153 | 100.0 | 500.0 |
| "Triton" X405 | 2.8 | 11.0 |
| "Tamol" 850 | 1.2 | 11.0 |
| "Expantrol" 4B | 141.0 | 387.0 |
| "Firebrake" ZB (fine) | 25.0 | 69.0 |
| "Techfill" A-212 | 25.0 | 69.0 |
| "Exolit" IFR-10 | 75.0 | 206.0 |

This caulkable mixture had a flow rate through a 6.4 mm orifice at 345 kPa of at least 500 g/min. Its volume expansion factor was 2.87. The char strength was 7.

EXAMPLE 5

The following ingredients were mixed in the order listed into a paddle-type mixer (Hobart Model N-50) with continuous mixing for about 20 minutes at room temperature.

|  | Parts | |
|---|---|---|
|  | (dry) | (wet) |
| "Flexbond" 149 | 100.0 | 500.0 |
| "Triton" X405 | 2.8 | 11.0 |
| "Tamol" 850 | 1.2 | 11.0 |
| "Expantrol" 4B | 141.0 | 387.0 |
| "Firebrake" ZB (fine) | 25.0 | 69.0 |
| "Techfill" A-212 | 25.0 | 69.0 |
| "Exolit" IFR-10 | 75.0 | 206.3 |
| "Methocel" K4M | 3.6 | 10.0 |

This caulkable mixture had a flow rate through a 6.4 mm orifice at 345 kPa of at least 500 g/min. Its volume expansion factor was 2.71. The char strength was 8.

EXAMPLE 6

The following ingredients were mixed in the order listed into a paddle-type mixer (Hobart Model N-50) with continuous mixing for about 20 minutes at room temperature. The Foamaster was added continuously throughout the mixing.

|  | Parts | |
|---|---|---|
|  | (dry) | (wet) |
| "HA-8" latex | 100.0 | 250.0 |
| "Triton" X405 | 2.8 | 4.6 |
| "Tamol" 850 | 1.2 | 4.6 |
| "Expantrol" 4B | 144.0 | 162.0 |
| "Firebrake" ZB (fine) | 25.0 | 28.8 |
| "Techfill" A-212 | 25.0 | 28.8 |
| "Ceepree" C200 | 12.5 | 14.4 |
| "Phoschek" P-30 | 37.5 | 43.1 |
| "Foamaster" 111 | 0.9 | 2.0 |

This caulkable mixture had a flow rate through a 6.4 mm orifice at 345 kPa of at least 500 g/min. Its volume expansion factor was 3.50. The char strength was 8.

EXAMPLE 7

The following ingredients were mixed in the order listed into a paddle-type mixer (Hobart Model N-50) with continuous mixing for about 20 minutes at room temperature.

|  | Parts | |
|---|---|---|
|  | (dry) | (wet) |
| "Flexbond" 153 | 100.0 | 500.0 |
| "Triton" X405 | 2.8 | 11.0 |
| "Tamol" 850 | 1.2 | 11.0 |
| "Expantrol" 4B | 141.0 | 387.0 |
| "Firebrake" ZB (fine) | 25.0 | 69.0 |

-continued

|  | Parts | |
|---|---|---|
|  | (dry) | (wet) |
| "Techfill" A-212 | 25.0 | 69.0 |
| "Ceepree" C200 | 12.5 | 34.4 |
| "Phoschek" P-30 | 37.5 | 103.0 |

This caulkable mixture had a flow rate through a 6.4 mm orifice at 345 kPa of at least 500 g/min. Its volume expansion factor was 3.06. The char strength was 8.

EXAMPLE 8

The following ingredients were mixed in the order listed into a paddle-type mixer (Hobart Model N-50) with continuous mixing for about 20 minutes at room temperature.

|  | Parts | |
|---|---|---|
|  | (dry) | (wet) |
| "Flexbond" 149 | 100.0 | 500.0 |
| "Triton" X405 | 2.8 | 11.0 |
| "Tamol" 850 | 1.2 | 11.0 |
| "Expantrol" 4B | 141.0 | 387.0 |
| "Firebrake" ZB (fine) | 25.0 | 69.0 |
| "Techfill" A-212 | 25.0 | 69.0 |
| "Ceepree" C200 | 12.5 | 34.4 |
| "Phoschek" P-30 | 37.5 | 103.0 |

This caulkable mixture had a flow rate through a 6.4 mm orifice at 345 kPa of at least 500 g/min. Its volume expansion factor was 3.19. The char strength was 8.

Other embodiments of this invention will be apparent to those skilled in the art from the consideration of this specification or practice of the invention disclosed herein. Various omissions, modifications, or changes to the principles described herein may be made by one skilled in the art without departing from the true scope and spirit of the invention which is indicated by the following claims.

What is claimed is:

1. Water-based, intumescent fire retardant caulk material consisting essentially of
   (a) a latex consisting of a halogenated polymer and water, said water present in the caulk material in an amount ranging from about 30 to about 50 weight percent of the total latex weight; and
   (b) water-insoluble intumescent mineral granules consisting of a mixture of alkali metal silicate, represented by the formula $M_2O:xSiO_2$ in which M is the alkali metal; at least one oxy boron compound selected from the group consisting of boric acid and borate salts of Group I and Group II elements; and water; in which the weight ratio of x ranges from about 1.5 to about 4, the molar ratio of boron to M is between about 0.2 and about 0.9, and the water is about 5 to about 15 weight percent of the total granule weight, and wherein the weight ratio of said halogenated polymer to said water-insoluble intumescent mineral granules ranges from about 1.4:1 to about 0.7:1, which material dries to an elastomeric state.

2. Water-based, intumescent material as defined in claim 1 wherein the latex comprises polychloroprene latex.

3. Water-based intumescent material as defined in claim 1 and further comprising from 2 to 15 parts of cellulosic thickener.

4. Water-based, intumescent material as defined in claim 3 and having a flow rate through a 6.4-mm orifice at 345 kPa of more than 150 g/min. thus being caulkable.

5. Water-based intumescent material as defined in claim 1 and further comprising up to 50 parts of an endothermic filler.

6. Water-based, intumescent material as defined in claim 5 wherein said endothermic filler comprises aluminum oxide trihydrate.

7. Water-based, intumescent material as defined in claim 1 wherein said hydrated alkali metal silicate granules incorporate an oxy boron compound.

8. Water-based, intumescent material as defined in claim 1 wherein the expansion factor is at least 2.

9. Method of enhancing the fire retardancy of a wall or floor comprising the steps of
   (1) preparing a water-based, intumescent, fire retardant caulk material by blending a latex consisting of a halogenated polymer and water, said water present in the caulk material in an amount ranging from about 30 to about 50 weight percent of the total latex weight, and water-insoluble intumescent mineral granules consisting of a mixture of alkali metal silicate, represented by the formula $M_2O:xSiO_2$ in which M is the alkali metal; at least one oxy boron compound selected from the group consisting of boric acid and borate salts of Group I and Group II elements; and water; in which the weight ratio of x ranges from about 1.5 to about 4, the molar ratio of boron to M is between about 0.2 and about 0.9, and the water is about 5 to about 15 weight percent of the total granule weight, which expands and releases water upon the application of heat, wherein the weight ratio of said halogenated polymer to said water-insoluble intumescent mineral granules ranges from about 1.4:1 to about 0.7:1,
   (2) applying said material to openings through said wall or floor, and
   (3) allowing the applied material to dry to an elastomeric state.

10. Water-based, intumescent fire retardant caulk material consisting essentially of
    (a) a latex consisting of a non-halogenated polymer and water, said water present in the caulk material in an amount ranging from about 30 to about 50 weight percent of the total latex weight;
    (b) 5 to 200 parts (dry weight basis of caulk) fire retardant, and
    (c) water-insoluble intumescent mineral granules consisting of a mixture of alkali metal silicate, represented by the formula $M_2O:xSiO_2$ in which M is the alkali metal; at least one oxy boron compound selected from the group consisting of boric acid and borate salts of Group I and Group II elements; and water; in which the weight ratio of x ranges from about 1.5 to about 4, the molar ratio of boron to M is between about 0.2 and about 0.9, and the water is about 5 to about 15 weight percent of the total granule weight, wherein the weight ratio of said non-halogenated polymer to said water-insoluble intumescent mineral granules ranges from about 2:1 to about 1:2, which material dries to an elastomeric state.

11. Water-based, intumescent material as defined in claim 10 wherein the non-halogenated polymer is an ethylene/vinylacetate/acrylate terpolymer.

12. Water-based intumescent material as defined in claim 10 and further comprising from 2 to 15 parts of a cellulosic thickener.

13. Water-based, intumescent material as defined in claim 12 and having a flow rate through a 6.4-mm orifice at 345 kPa of more than 150 g/min. thus being caulkable.

14. Water-based intumescent material as defined in claim 10 and further comprising up to 50 parts of an endothermic filler.

15. Water-based, intumescent material as defined in claim 14 wherein said endothermic filler comprises aluminum oxide trihydrate.

16. Water-based, intumescent material as defined in claim 10 wherein said hydrated alkali metal silicate granules incorporate an oxy boron compound.

17. Water-based, intumescent material as defined in claim 10 wherein the expansion factor is at least 2.

18. Water-based, intumescent material as defined in claim 10 wherein said fire retardant comprises a blend of zinc borate and phosphorus containing compound.

19. Method of enhancing the fire retardancy of a wall or floor comprising the steps of
   (1) preparing a water-based, intumescent, fire retardant caulk material by blending a latex consisting of a non-halogenated polymer and water, said water present in the caulk material in an amount ranging from about 30 to about 50 weight percent of the total latex weight, 5 to 200 parts (dry basis of caulk weight) fire retardant, and water-insoluble intumescent mineral granules consisting of a mixture of alkali metal silicate, represented by the formula $M_2O:xSiO_2$ in which M is the alkali metal; at least one oxy boron compound selected from the group consisting of boric acid and borate salts of Group I and Group II elements; and water; in which the weight ratio of x ranges from about 1.5 to about 4, the molar ratio of boron to M is between about 0.2 and about 0.9, and the water is about 5 to about 15 weight percent of the total granule weight, which expands and releases water upon the application of heat, wherein the weight ratio (dry basis) of said non-halogenated polymer to said water-insoluble intumescent mineral granules ranges from about 2:1 to about 1:2;
   (2) applying said material to openings through said wall or floor, and
   (3) allowing the applied material to dry to an elastomeric state.

* * * * *

UNITED STATES PATENT AND TRADEMARK OFFICE
CERTIFICATE OF CORRECTION

PATENT NO. : 5,175,197

DATED : December 29, 1992

INVENTOR(S) : Robert E. Gestner and Roger L. Langer

It is certified that error appears in the above-identified patent and that said Letters Patent is hereby corrected as shown below:

Col. 10, line 61     "ratio of" should read
                             -- ratio (dry basis) of --

Signed and Sealed this

Twenty-third Day of November, 1993

*Attest:*

BRUCE LEHMAN

*Attesting Officer*        *Commissioner of Patents and Trademarks*